(12) United States Patent
Filipitsch et al.

(10) Patent No.: US 9,060,651 B2
(45) Date of Patent: Jun. 23, 2015

(54) ROTARY BEATER AND KITCHEN APPLIANCE FOR USE WITH A ROTARY BEATER

(75) Inventors: Harald Filipitsch, Ludmannsdorf (AT); Heimo Obersteiner, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1169 days.

(21) Appl. No.: 12/995,681

(22) PCT Filed: Jun. 10, 2009

(86) PCT No.: PCT/IB2009/052475
§ 371 (c)(1),
(2), (4) Date: Dec. 2, 2010

(87) PCT Pub. No.: WO2009/150621
PCT Pub. Date: Dec. 17, 2009

(65) Prior Publication Data
US 2011/0085412 A1    Apr. 14, 2011

(30) Foreign Application Priority Data
Jun. 11, 2008   (EP) ..................................... 08158002

(51) Int. Cl.
*A47J 43/10*   (2006.01)
*B01F 7/00*    (2006.01)

(52) U.S. Cl.
CPC ......... *A47J 43/1093* (2013.01); *B01F 7/00583* (2013.01)

(58) Field of Classification Search
CPC ........................... A47J 43/0711; A47J 43/1093
USPC ................................................... 366/343, 129
See application file for complete search history.

(56) References Cited

U.S. PATENT DOCUMENTS

| 2,747,845 | A |   | 5/1956 | Kohl et al. |
| 3,154,297 | A | * | 10/1964 | Lovgren .................... 416/227 R |
| 5,520,458 | A | * | 5/1996 | Arutyunov et al. ........... 366/297 |
| 5,584,112 | A | * | 12/1996 | Diore et al. ...................... 29/434 |
| 5,590,962 | A | * | 1/1997 | Millan et al. .................. 366/248 |
| 2011/0085412 | A1 | * | 4/2011 | Filipitsch et al. ............. 366/343 |

FOREIGN PATENT DOCUMENTS

| DE | 1 429 978 | * | 11/1968 |
| DE | 1941321 A1 | | 2/1971 |
| DE | 3225450 A1 | | 1/1984 |

(Continued)

*Primary Examiner* — Tony G Soohoo

(57) ABSTRACT

A rotary beater is provided which comprises a drive shaft (2) adapted to be coupled to a drive arrangement and defining a longitudinal axis (16) about which the beater is rotatable. The beater has a beater body (6), comprising a wire loop (8) which is coupled to the drive shaft (2) and which extends from the drive shaft in the direction of the longitudinal axis (16) and is led back to the drive shaft (2). The wire loop (8) comprises a first section, (I) a second section (II) comprising two upper segments (8b, 8g) and two lower segments (8c, 8f). Each upper segment (8b, 8g) is connected to the first section (I), and to a respective lower segment (8c, 8f) of the second section (II). The wire loop (8) further comprises a third section (III) for connecting the lower segments (8c, 8f) of the second section (II). Mutually connected upper (8b, 8g) and lower segments (8c, 8f) of the second section (II) define a plane (xa, xb) which is substantially parallel to the longitudinal axis (16).

15 Claims, 3 Drawing Sheets

(56) References Cited

FOREIGN PATENT DOCUMENTS

| | | |
|---|---|---|
| DE | 19820915 A1 | 11/1999 |
| DE | 20119947 U1 | 5/2002 |
| FR | 1397685 | 4/1965 |
| FR | 1523423 A | 5/1968 |
| GB | 977761 A | 12/1964 |
| NL | 6713283 | 4/1969 |
| SU | 1473828 A1 | 4/1989 |
| WO | 0200079 A1 | 1/2002 |
| WO | 2008000627 A1 | 1/2008 |

* cited by examiner

ROTARY BEATER AND KITCHEN APPLIANCE FOR USE WITH A ROTARY BEATER

FIELD OF THE INVENTION

The present invention relates to a rotary beater adapted to be rotated by a drive arrangement. The beater may be used in electrical household or kitchen appliances, food processors and the like. The beater can be used for beating, mixing, whipping or whisking fluid material, in particular foodstuff.

BACKGROUND OF THE INVENTION

French patent document FR 1.397.685 discloses a rotary beater comprising a single wire loop that extends from the drive shaft of the beater. The single wire loop can be divided in three sections or portions over the length of the wire loop, a first section extending outwardly with respect to the drive shaft, a second section comprising two mutually angled segments and a third section returning the wire loop back to the drive shaft. The second section and its segments are arranged such that a lower end of the second section trails an upper end thereof when the beater is rotated. The angled segments each form a leg of the wire loop. Said legs are arranged such that they cross each other, i.e. the wire loop is twisted around its longitudinal axis. According to FR 1.397.685 the specific form of the beater contributes to the agitation or aerating that can be achieved by the beater.

A problem associated with the known beater is, that although an improved agitation is achieved, that effect of the beater is not optimized and can be further improved.

OBJECT OF THE INVENTION

The present invention aims to improve the rotary beater known from the prior art such as to optimize the volume increase for whisking and whipping, providing a stronger aerating effect, and to reduce the time needed to process the material.

SUMMARY OF THE INVENTION

The above stated object is achieved by a rotary beater adapted to be rotated in a predetermined direction of rotation. The beater comprises a drive shaft adapted to be coupled to a drive arrangement, the drive shaft defining a longitudinal axis about which the beater is rotatable and comprises a beater body, comprising at least one wire loop which is coupled to the drive shaft and which extends from the drive shaft in the direction of the longitudinal axis and is led back to the drive shaft after a plurality of changes in its direction. The at least one wire loop comprises a first section comprising two first segments connecting the wire loop to the drive shaft, a second section comprising two upper segments and two lower segments. Each upper segment is connected to a respective first segment of the first section, and to a respective lower segment of the second section. The at least one wire loop further comprises a third section comprising two third segments, each third segment being connected to the other third segment and to one lower segment of the second section. Each couple of mutually connected upper and lower segments of the second section define a plane which is substantially parallel to the longitudinal axis or has a small angle with respect thereto, and said mutually connected upper and lower segments define an angle with respect to each other in said plane, such that said mutually connected upper segments and lower segments have different angular orientations with respect to the longitudinal direction.

The special geometry of the beater of the present invention is responsible for a significant reduced application time and a significant raised volume increase of the food in comparison to other wire beaters.

The inventors have realized that the agitation or aerating effect of the beater of the prior art is not optimal as this effect is only achieved over part of the second section thereof. Consequently, the inventors have realized that the agitation and/or aerating effect can be improved by providing that the actual speed, not the angular speed which is the same for any rotating part of the beater, of the upper and lower segments of the second section is substantially constant and maximized over substantially the whole height of the second section. This has been achieved by providing that each couple of mutually connected upper and lower segments of the second section, i.e. each 'leg' of the wire loop, defines a plane which is substantially parallel to the longitudinal axis. This results in the effect, that every part of such a leg will have the same, maximal speed when the beater is rotated. This is an improvement of the beater known from the prior art, which beater can only provide such a maximal speed over a minor part of the segments of the second section.

It is to be understood that within the context of the present invention the wording "a small angle" is intended to cover angles, between the plane in which the respective mutually connected upper and lower segments are arranged with respect to the longitudinal axis, which still result in the actual speed of these segments to be close to or to be equal to the maximal value. Hence, a plane that has a small angle with respect to the longitudinal axis does not depart from the scope of the invention. In practice such angles may be in the range of zero to fifteen degrees in either direction, i.e. such that the first section describes a larger outer diameter than the third section during rotation of the beater and vice versa.

In an embodiment the angle between the upper and lower segments is in the range of about 120° to about 140°, preferably about 130°. This range of angles has proven to provide very good results aerating of the fluid material and thus an increase in the volume thereof. In particular, this range of angles provides good results both for whisking and whipping.

In an embodiment a lower end of the respective upper segment is trailing an upper end thereof, and that an upper end and of the respective lower segment is trailing a lower end thereof in the direction of rotation. During rotation of the beater, this arrangement will make that the lower segments lift the food up and the upper segments smash the food downward. Additionally, the time for processing food is reduced, due to the downward beating of the upper segments.

In an embodiment said lower end of said lower segment is trailing said upper end of said upper end of said upper segment in the direction of rotation by a trailing angle, said trailing angle preferably being in the range of about 5° to about 30°. In this manner the upper part of a leg formed by the mutually connected segments of the second section is always ahead of the lower part thereof, which effectively prevents that the fluid material moves out of the beater body during rotation of the beater.

In an embodiment the first segments of the first section are inclined at an inclination angle in the range of 0 to 45° towards the third section and out of a plane that is perpendicular to the longitudinal axis.

In an embodiment the upper segments of the second section are angled with respect to the longitudinal axis about an angle in the range of 15 to 35°, preferably said angle is about 25°.

In an embodiment the third segments of the third section are inclined at an angle towards the drive shaft in the range of 0 to 30° and out of a plane that is perpendicular to the longitudinal axis, preferably said angle is about 10°. Reducing this angle will enable the beater to reach more of the material to be processed during each rotation, thus reducing the processing time. On the other hand, increasing this angle improves the handling of the beater. An optimum was found to exist at an angle of about 10°.

In an embodiment said wire loop has a circular cross-section. This provides good manufacturability of the wire loop.

In an embodiment the beater comprises two said wire loops, so as to further improve the working of the beater.

The invention further relates to a kitchen appliance, a food processor or the like, comprising a housing and a drive arrangement provided in said housing, said drive arrangement comprising coupling means for coupling with a rotary beater according to the invention.

Further rotary beaters are for example known from GB-977,761 which provides a beater including at least one wire-shaped beater element, which starts from the drive shaft, extends further in the direction of the drive shaft, and finally, after two changes in its direction of extension, is led back to the drive shaft. The wire element can substantially be subdivided into three sections. The first section is a rectilinear portion, extending away from the drive shaft. The second section is also rectilinear and extends along the drive shaft. The third section is rectilinear and extends from the end of the second section towards the drive shaft. The end of the first section leads the end of the third section when the beater is rotated. The first, second and third section are made by first bending a metal wire into a plane rectangle. Thereupon, two opposite sides, which are to form second sections, are bend out of the original plane of the rectangle in opposite directions so that one half of the rectangle is in a plane inclined to the plane of the other half. Owing to the bending effect, the second sections have a definite angle with respect to the longitudinal axis of the drive shaft. Due to the inclined second sections, the beater of GB-977,761, in use, imparts a stroke effect to the material to be processed. At the same time, a relatively mild aerating action is effected.

Likewise, U.S. Pat. No. 5,590,962 provides a beater comprising a wire element that consists of a subsequent first, second and third sections. U.S. Pat. No. 5,590,962 aims to provide an improved beater to allow mixing of foods without the foods being spattered inadmissibly. In use, the first section, which is the section nearest the drive shaft, lags behind the third section. The second section is divided in an upper segment and a lower segment of about equal length. Due to the upper segment lagging behind the lower segment, when viewed in the direction of rotation of the beater, the foods are caught by the lower segments particularly intensively and moved or tossed upwardly. The foods in the lower segments are lifted upwardly and radially outwardly. In the upper segments the foods are moved only in a radially outward direction, i.e. horizontally, as these segments extend radially outward to a slight degree, but substantially parallel to the drive shaft. As a result, the ascending foods are accelerated horizontally, which avoids the spattering of food. Besides having upper segments substantially parallel to the drive shaft, U.S. Pat. No. 5,590,962 teaches to arrange the lower segments at an angle of at least 60 degrees or more relative to the drive shaft, for optimal volume increase of the food.

BRIEF DESCRIPTION OF THE DRAWINGS

Further advantageous embodiments of the rotary beater according to the invention are described in the claims and in the following description with reference to the drawing, in which:

DETAILED DESCRIPTION OF EXAMPLES

Figure 1:
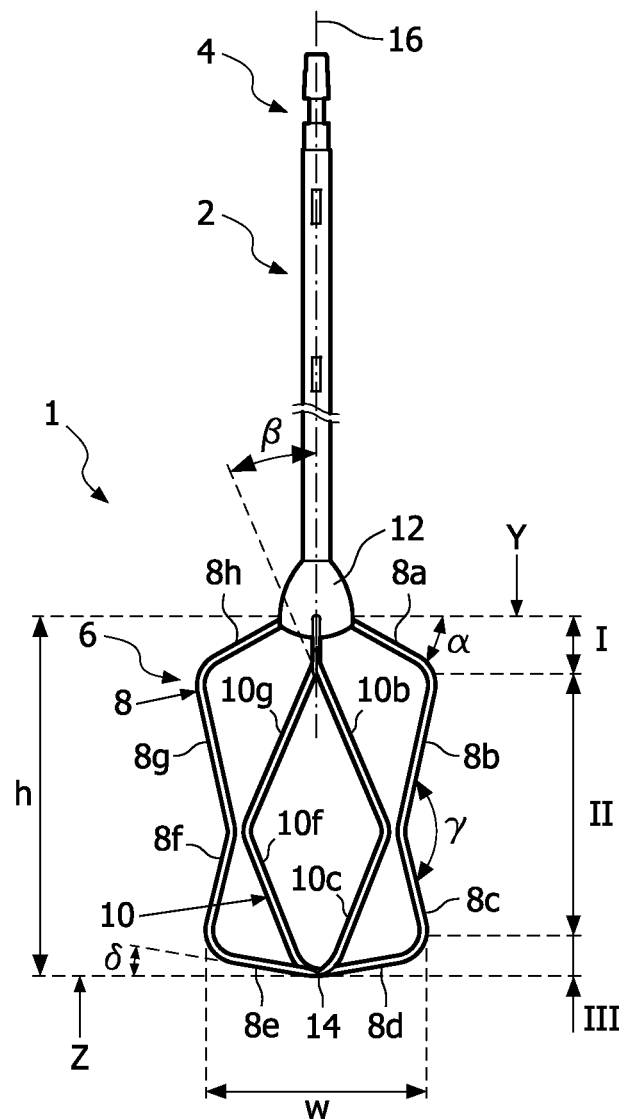
FIG. 1 shows a side view of a beater according to the present invention.
Figure 2:
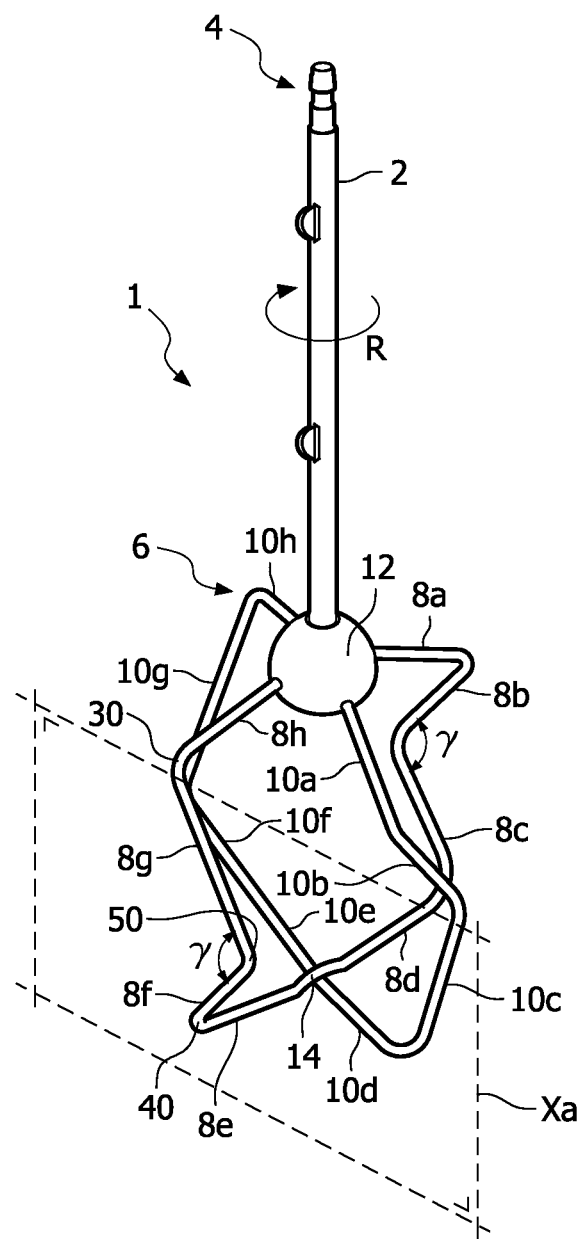
FIG. 2 shows a perspective view of the beater of FIG. 1.
Figure 3:
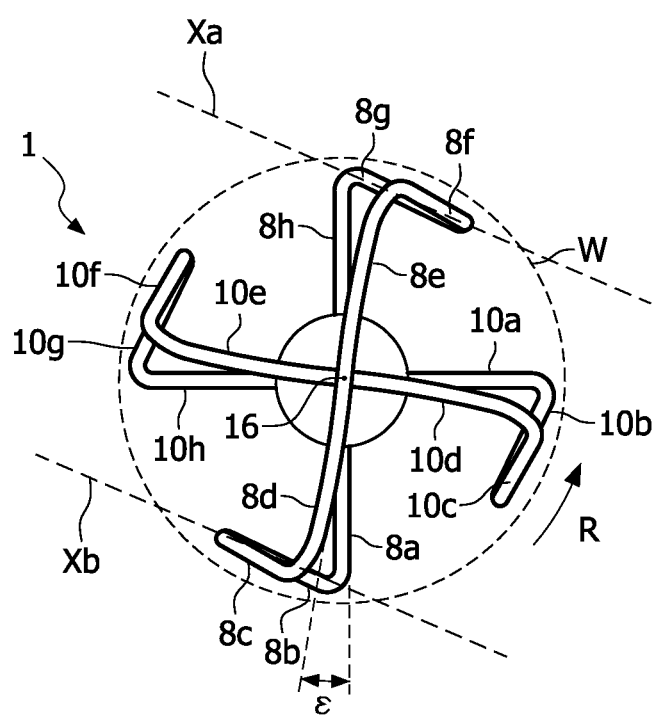
FIG. 3 shows a bottom view of the beater of FIG. 1.

With reference to FIGS. 1, 2 and 3 a rotary beater or whisk 1 according to the present invention is depicted. The beater 1 comprises a drive shaft 2, one end of which is provided with coupling part 4 adapted to be coupled to a driving arrangement of a kitchen appliance, food processor or the like. The drive shaft 2 defines a longitudinal axis 16 and may be provided with means, such as crimp noses, for securely attaching the drive shaft 2 to said kitchen appliance. The driving arrangement may be hand- or motor-operated. The beater 1 may be used with electrical kitchen machines, either hand-held or not. The kitchen machines may for instance be provided with one beater, or with two beaters rotating in opposite directions. The beater 1 according to the present invention is designed to be rotated in a direction of rotation as indicated with arrow R. Rotational speeds are for example in the range of 300 up to 1200 or 1500 rpm. In other words, the beater 1 according to the present invention is particularly suitable for use with foodstuff.

A free end 12 of the drive shaft 2 opposite of the coupling part 4 is provided with a beater body 6. The beater body 6 comprises one or more wire loops 8, 10. It is noted however that it is also conceivable to provide the beater 1 with only a single wire loop. The invention will hereinafter be described by means of a rotary beater comprising two wire loops, but is not limited thereto.

Each wire loop 8, 10 has a height h, and a width W. In the embodiment shown, the wire loops 8, 10 are arranged perpendicular to each other, i.e. at an angle of about 90°. This is best seen in FIG. 3. Hence, the wire loops 8, 10 are equally distributed in the direction of rotation R.

The wire loops 8, 10 are fabricated by bending a wire, preferably a metal wire, into a predetermined shape. The free ends of the wire loops 8, 10 are connected to the free end 12 of the drive shaft 2 by way of hub. However, other ways of attaching the wire loops to the drive shaft 2 are also conceivable, such as welding. The wire loops 8, 10 intersect each other at the lower end of the beater 1. Preferably the wire loops 8, 10 consist of wire that is circular in cross-section, but are not limited thereto. The wire loops 8, 10 are preferably connected to each other at an intersection 14 where both wire loops cross each other. This improves mechanical stability of the beater 1.

FIGS. 1 and 2 show the general shape of the wire loops 8, 10 in detail. The wire loops 8, 10 comprise a first section I located in the upper part of the beater body 6, a second section II located in the middle part of the beater body 6, and a third section III located in the bottom part of the beater body 6. This is indicated in FIG. 1.

Each first section I comprises two first segments 8a, 8h, 10a, 10h, which in the example of FIG. 2, are substantially straight and extend substantially radially outward from the drive shaft 2. It is also possible that the first segments 8a, 8h, 10a, 10h are bend. The first segments 8a, 8h, 10a, 10h are shown to be inclined at an inclination angle α out of a plane Y (the plane Y is only shown in two dimensions in FIG. 1, but the plane Y is perpendicular to the longitudinal axis 16 of the beater 1) towards the third section III of the beater body 6. In a practical embodiment, the inclination angle α may be in the range of 0 to 45°, or in the range of 10° to 40°, for instance about 30°. However other values for the inclination angle are also possible. The first section I connects the second section II to the drive shaft 2. For practical reasons, the first section I is made from wire also, but may alternatively be in the shape of a disc for example. Other ways of designing the first section I are also conceivable without departing from the scope of the invention.

Each second section II of a single wire loop comprises two upper segments 8b, 8g, 10b, 10g and two lower segments 8c, 8f, 10c, 10f. The upper segments can be seen to extend in a downward direction in the Figures. The upper segments 8b, 8g; 10b, 10g are arranged in a plane that is inclined at an angle β relative to the longitudinal axis 16.

In a practical embodiment, the angle β is in the range of 15 to 35°, having an optimum of about 25°. Likewise, the lower segments are arranged in a plane that is inclined relative to the longitudinal axis 16 at an angle in the range of 15 to 35°, or preferably 20 to 30°, having an optimum at about 22 to 25°.

The two lower segments 8c, 8f, 10c, 10f likewise extend in a downward direction in the Figures, and are arranged at an angle γ relative to the respective upper segments to which they are connected. As is shown with reference to FIGS. 2 and 3, each wire loop comprises two mutually connected upper and lower segments 8b, 8c; 8g, 8f; 10b, 10c and 10g, 10f, such that each mutually connected couple of upper and lower segments form a leg of the beater body 6. Further, as is indicated in FIGS. 2 and 3, such legs or each mutually connected upper and lower segment of the second section II define respective planes Xa and Xb which are substantially parallel to the longitudinal axis 16. In other words said planes Xa, Xb does not intersect the longitudinal axis 16. This results, as can be best seen in FIG. 3, that the second section II and its segments are located as close as possible to the outer radius or width W of the beater body 6 and are thus all subjected to the same actual speed (not only the rotational speed) when the beater 1 is rotated. It is noted that planes Xa and Xb may also be at small angles with respect to the longitudinal axis 16. In fact, it is to be understood that within the context of the present invention the wording "a small angle" is intended to cover angles which still result in the actual speed of these segments to be close to or to be equal to the maximal value. Hence, a plane that has a small angle with respect to the longitudinal axis does not depart from the scope of the invention. In practice such angles may be in the range of zero to fifteen degrees in either direction, i.e. such that the first section describes a larger outer diameter than the third section during rotation of the beater and vice versa.

Within said planes Xa, Xb the respective mutually connected upper and lower segments define angle γ with respect to each other, such that the said segments have different angular orientations with respect to the longitudinal axis 16. The angle γ is located substantially halfway of the second section II. i.e. between the upper and lower segments which have about the same length. The angle γ equals about 130° (FIGS. 1 and 2). The angle γ is a compromise for whisking and whipping and preferably is within the range of 120° to about 140°. Whisking being optimal at an angle γ of about 140°, whipping being optimal at an angle γ of about 120°.

Each third section comprises two third segments 8d, 8e; 10d, 10e which extend substantially radially outwards from the longitudinal direction 16 in a manner similar to the first segments of the first section. The third segments of the third section may be inclined at an angle δ out of a plane Z towards the free end 12 of the drive shaft 2 (the plane Z is only shown in two dimensions in FIG. 1, but is perpendicular to the longitudinal axis 16 of the beater 1).

In a practical embodiment, the angle δ may be in the range of 0 to 30°, for instance about 10°. Reducing the angle δ will enable the beater to reach more of the processed material during each rotation, thus reducing the processing time. On the other hand, increasing the angle δ improves the handling of the beater. An optimum was found at an angle δ of about 10°.

Each third segment 8d, 8e; 10d, 10e is connected to the other third segment of the same wire loop 8, 10 so as to close said wire loop by interconnecting both second sections II of the respective wire loop.

Returning to the second section II of a single wire loop in particular to a single leg formed by two mutually connected upper and lower segments, it can be seen in FIG. 2 that said mutually connected upper segments and lower segments have mutually opposed angular orientations with respect to the direction of rotation R, such that a lower end 50 of the respective upper segment 8g is trailing an upper end 30 thereof, and that an upper end 50, which coincides with the lower end of the upper segment, of the respective lower segment 8f is trailing a lower end 40 thereof in the direction of rotation R. This has the effect that the fluid material to be processed will be lifted upward by the lower segment(s) and beaten downward by the upper segment(s).

This has the further effect, that the third segments 8d, 8e; 10d, 10e of the third section lag behind the first segments 8a, 8h; 10a, 10h of the first section I at an angle ε in the direction of rotation R. In a practical embodiment, the angle ε may be in the range of 5 to 30°, for instance about 15°. In this manner the upper part of a leg formed by the mutually connected segments of the second section is always ahead of the lower part thereof, which effectively prevents that the fluid material moves out of the beater body during rotation of the beater.

The second section II is hence disposed between the first section I and the third section III, such that the maximum diameter of the wire loops (width W) is not exceeded, although all ends of the lower and upper segments of the second section are arranged at about substantially the same distance 0.5*W from the longitudinal axis 16.

The beater of the present invention is an improvement compared to existing rotary beaters. The advantage of the above described beater is its geometrical shape which provides a significantly reduced application time and a significantly raised volume increase in comparison to straight wired beaters. The beater of the present invention is a cheap and attractive base function for a hand mixer.

The special geometry of the beater is responsible for a significantly reduced application time and a significant raised volume increase in comparison to other wire beaters. During rotation of the beater, the lower segments of the second sections II lift the food ingredients, whereas the upper segments of the second sections II smash the food ingredients downward. Through this procedure air is introduced in the ingredients and the volume is increased in comparison to other already available wire beaters. The working of the beater according to the invention is further improved due to the fact that those parts of the beater, i.e. the upper and lower segments of the second sections, all have the highest speed possible and said speed is substantially constant over the entire length of the second sections.

While the subject-matter has been illustrated in the drawings and the foregoing description, such illustration and description are to be considered illustrative or exemplary and not restrictive; the subject-matter is not limited to the disclosed embodiments. Other variations to the disclosed embodiments can be understood and effected by those skilled in the art of practicing the claimed subject-matter, from a study of the drawings, the disclosure and the appended claims. Use of the verb "comprise" and its conjugations does not exclude the presence of other elements other than those stated in a claim or in the description. Use of the indefinite article "a" or "an" preceding an element or step does not exclude the presence of a plurality of such elements or steps. The Figures and description are to be regarded as illustrative only and do not limit the subject-matter. Any reference sign in the claims should not be construed as limiting the scope In the described examples the wire loops have a circular cross-section. However alternative cross-sectional shapes are also possible, such as rectangular, triangular, elliptical etcetera.

In the described examples, the wire loop or loops are attached to the drive shaft at a free end thereof. It is however also conceivable that the beater body comprising the wire loop(s) is attached to the drive at a point between the upper part thereof and the opposed free end, for example such that the third section of the beater body is connected to the free end of the drive shaft. It is also conceivable in such a case that the beater body is detachably connected to the drive shaft so as to be moveable along the drive shaft and to obtain a beater that has a variable length.

The invention claimed is:

1. A rotary beater (1) adapted to be rotated in a predetermined direction of rotation (R), the beater comprising:
    a drive shaft (2) adapted to be coupled to a drive arrangement, the drive shaft (2) defining a longitudinal axis (16) about which the beater is rotatable; and
    a beater body (6) comprising at least one wire loop (8) that extends transversely from the drive shaft (2), then in the direction of the longitudinal axis (16), and is led back to drive shaft (2) after a plurality of changes in its direction, the at least one wire loop (8) comprising:
        a first section (I) comprising two first segments (8a, 8h) connecting the wire loop (8) to the drive shaft;
        a second section (II) comprising two upper segments (8b, 8g) and two lower segments (8c, 8f), each upper segment (8b, 8g) being connected to a respective first segment (8a, 8h) of the first section (I) and to a respective lower segment (8c, 8f) of the second section (II); and
        a third section (III) comprising two third segments (8d, 8e), each third segment being connected to the other third segment and to a respective one of the lower segments (8c, 8f) of the second section (II);
    each pair of mutually connected upper and lower segments (8b, 8c; 8g, 8f) of the second section (II) being arranged to define a plane (Xa, Xb) that is substantially parallel to the longitudinal axis (16) or has a small angle with respect thereto and is spaced from the longitudinal axis by a distance approximately equal to an outer radius of the beater body; and
    said mutually connected upper and lower segments (8b, 8c; 8g, 8f) being arranged to define an angle (γ) with respect to each other in said plane (Xa, Xb), such that said mutually connected upper segments (8b, 8g) and lower segments (8c, 8f) have different angular orientations with respect to the direction of the longitudinal axis.

2. The rotary beater according to claim 1, wherein the angle (γ) between the upper and lower segments (8b, 8c; 8g, 8f) is in the range of about 120° to about 140°.

3. The rotary beater according to claim 1, wherein the angle (γ) between the upper and lower segments (8b, 8c; 8g, 8f) is about 130°.

4. The rotary beater according to claim 1, wherein a lower end (40) of said lower segment (8c, 8f) is angled to trail an upper end (30) of said upper segment (8b, 8g) by a trailing angle (ε) when the beater is rotated in a predetermined direction of rotation (R).

5. The rotary beater according to claim 4, wherein said trailing angle (ε) is in the range of about 5° to about 30°.

6. The rotary beater according to claim 1, wherein a lower end (50) of the respective upper segment (8b, 8g) trails an upper end (30) thereof, and that an upper end (50) of the respective lower segment (8c, 8f) trails a lower end (40) thereof when the beater is rotated in a predetermined direction of rotation (R).

7. The rotary beater of claim 1, wherein the first segments (8a, 8h) of the first section (I) are inclined at an inclination angle (α) in the range of 0 to 45° towards the third section (III) and relative to a plane (Y) that is perpendicular to the longitudinal axis (16).

8. The rotary beater of claim 1, wherein the upper segments (8b, 8g) of the second section (II) are angled with respect to the longitudinal axis by an angle (β) in the range of 15 to 35°.

9. The rotary beater of claim 8, wherein the angle (β) of the upper segments (8b, 8g) of the second section (II) is about 25°.

10. The rotary beater of claim 1, wherein the third segments (8d, 8e) of the third section (III) are inclined at an angle (δ) towards the drive shaft (2) in the range of 0 to 30° and relative to a plane (Z) that is perpendicular to the longitudinal axis (16).

11. The rotary beater according to claim 10, wherein the angle (δ) is about 10°.

12. The rotary beater according to claim 1, wherein said wire loop (8) has a substantially circular cross-section.

13. The rotary beater according to claim 1, comprising two said wire loops (8, 10).

14. The rotary beater according to claim 12, wherein said wire loops (8, 10) are equally distributed in the direction of rotation (R).

15. An apparatu comprising a housing and a drive arrangement provided in said housing, said drive arrangement comprising coupling means for coupling with a rotary beater comprising:
    a drive shaft (2) adapted to be coupled to a drive arrangement, the drive shaft (2) defining a longitudinal axis (16) about which the beater is rotatable; and
    a beater body (6) comprising at least one wire loop (8) that extends transversely from the drive shaft (2), then in the direction of the longitudinal axis (16), and is led back to drive shaft (2) after a plurality of changes in its direction, the at least one wire loop (8) comprising:
        a first section (1) comprising two first segments (8a, 8h) connecting the wire loop (8) to the drive shaft;
        a second section (II) comprising two upper segments 8b, 8g) and two lower segments (8c, 8f), each upper segment (8b, 8g) being connected to a respective first segment (8a, 8h) of the first section (I) and to a respective lower segment (8c, 8f) of the second section (II); and
        a third section (III) comprising two third segments (8d, 8e), each third segment being connected to the other third segment and to a respective one of the lower segments (8c, 8f) of the second section (II);
    each pair of mutually connected upper and lower segments (8b, 8c: 8g, 8f) of the second section (II) being arranged to define a plane (Xa, Xb) that is substantially parallel to the longitudinal axis (16) or has a small angle with respect thereto and is spaced from the longitudinal axis by a distance approximately equal to an outer radius of the beater body; and said mutually connected upper and lower segments (8*b*, 8*c*; 8*g*, 8*f*) being arranged to define an angle ($\gamma$) with respect to each other in said plane (Xa, Xb), such that said mutually connected upper segments (8*b*, 8*g*) and lower segments (8*c*, 8*f*) have different angular orientations with respect to the direction of the longitudinal axis.

* * * * *